(12) United States Patent
Kim

(10) Patent No.: US 8,672,525 B2
(45) Date of Patent: Mar. 18, 2014

(54) PROJECTION HEAD LAMP ASSEMBLY FOR VEHICLE

(75) Inventor: Jong Bok Kim, Suwon-si (KR)

(73) Assignee: Kia Motors Corporation, Seoul (KR)

( * ) Notice: Subject to any disclaimer, the term of this patent is extended or adjusted under 35 U.S.C. 154(b) by 251 days.

(21) Appl. No.: 13/228,149

(22) Filed: Sep. 8, 2011

(65) Prior Publication Data
US 2012/0113663 A1 May 10, 2012

(30) Foreign Application Priority Data
Nov. 10, 2010 (KR) .......................... 10-2010-0111695

(51) Int. Cl.
*F21V 14/08* (2006.01)
*B60Q 1/04* (2006.01)

(52) U.S. Cl.
USPC ............ 362/513; 362/284; 362/324; 362/539

(58) Field of Classification Search
USPC .................. 362/512, 513, 539, 284, 324, 538
See application file for complete search history.

(56) References Cited

U.S. PATENT DOCUMENTS

| | | | |
|---|---|---|---|
| 5,650,684 A | 7/1997 | Suganuma | |
| 6,428,195 B1 * | 8/2002 | Ohshio et al. | 362/512 |
| 6,443,606 B1 * | 9/2002 | Mochizuki | 362/513 |
| 7,267,465 B2 * | 9/2007 | Mochizuki et al. | 362/539 |
| 7,364,331 B2 * | 4/2008 | Tajima | 362/509 |
| 7,370,996 B2 * | 5/2008 | Ohshio | 362/539 |
| 2008/0192496 A1 | 8/2008 | Mochizuki et al. | |

FOREIGN PATENT DOCUMENTS

| | | | |
|---|---|---|---|
| KR | 10-1996-0014719 A | 5/1996 | |
| KR | 10-2003-0005780 A | 1/2003 | |
| KR | 10-2004-0106825 A | 12/2004 | |
| KR | 10-2006-0070650 A | 6/2006 | |
| KR | 10-2010-0122644 A | 11/2010 | |

* cited by examiner

*Primary Examiner* — Alan Cariaso
(74) *Attorney, Agent, or Firm* — Morgan, Lewis & Bockius LLP

(57) ABSTRACT

A projection head lamp assembly for a vehicle may include a bulb irradiating light, a reflector supporting the bulb and reflecting the light irradiated from the bulb to the front, a shield unit including a shield shaft supported by the reflector and a shield integrated on the shield shaft, a drive cam inserted into one end of the shield shaft to be rotated according to a straight movement of a solenoid, and a lens connected to the front of the reflector. The projection head lamp assembly may further include a return spring provided on an outer circumference of the shield shaft, and weights inserted into both ends of the shield shaft for preventing free movement of the shield shaft when the shield shaft is rotated.

4 Claims, 5 Drawing Sheets

PROJECTION HEAD LAMP ASSEMBLY FOR VEHICLE

CROSS-REFERENCE TO RELATED APPLICATION

The present application claims priority of Korean Patent Application Number 10-2010-0111695 filed on Nov. 10, 2010, the entire contents of which application is incorporated herein for all purposes by this reference.

BACKGROUND OF INVENTION

1. Field of Invention

The present invention relates to a projection head lamp assembly for a vehicle, and more particularly, to a projection head lamp assembly for a vehicle, which has a rapid operation response property during shifting between low beams and high beams.

2. Description of Related Art

Vehicle head lamps, which are also called vehicle headlights, are illumination lamps that emit light in the front direction of the vehicle in which the vehicle travels. The head lamps require brightness enough to enable a driver to verify obstacles that are one hundred meters ahead on a road at night.

A head lamp assembly in the related art (Japanese Unexamined Patent Publication No. 2001-110213), as illustrated in FIG. 5, includes a bulb 22, a reflector 24 supporting the bulb 22 and reflecting light irradiated from the bulb 22 in the front direction, and a lens 28 connected to the front of the reflector 24 by a holder 26.

Such a head lamp assembly is constructed to shill light irradiated from the bulb 22 to low beam or high beam through an operation of a shield unit that is provided inside the head lamp assembly.

The shield unit includes a rotating pin 36, and a shield 32 rotating around the rotating pin 36. The shield 32 is rotated according to a straight movement of a solenoid 42 to make the light irradiated from the bulb 22 to the low beam or the high beam.

Specifically, at an initial state where the solenoid 42 does not operate, the shield 32 makes the light irradiated from the bulb 22 be shifted to the low beam state, while if the solenoid 42 moves straight in the front direction, the shield 32 is rotated to the front around the rotating pin 36 to make the light be shifted to the high beam state.

At this time, the position of an upper end 32A of the shield 32 becomes an important position that determines the light distribution according to the rule, and in the above-described structure in the related art, the position of the shield 32 becomes unstable.

This is because since the solenoid 42 has a structure that rotates the shield 32 by pushing a lower end of the shield 32 rather than a structure that rotates the shield 32 by directly rotating the rotating pin 36, the operation distance between the shield 32 and the solenoid 42 is long and thus the position of the shield 32 is varied to cause the unstable operability. Further, although it is required that the operation of the shield 32 is performed in an instant (0.4 second), the structure in the related art has limitations in obtaining an instantaneous speed of the shield 32.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a projection head lamp assembly for a vehicle, which can improve the operation response property through generation of an instantaneous torque and implement a compact structure in comparison to the head lamp assembly in the related art.

Aspects of the present invention are directed to provide a projection head lamp assembly for a vehicle, which includes a bulb irradiating light, a reflector supporting the bulb and reflecting the light irradiated from the bulb to the front, a shield unit including a shield shaft supported by the reflector and a shield integrally provided on the shield shaft, a drive cam inserted into one end of the shield shaft to be rotated according to a straight movement of a solenoid, and a lens connected to the front of the reflector.

Here, one feature of the present invention may be characterized by that a return spring having one end coupled to the drive cam and the other end coupled to the shield shaft is provided on an outer circumference of the shield shaft.

Another feature of the present invention may be characterized by that in the case of shifting from low beam to high beam, a power is applied to the solenoid to pull the drive cam to the rear and the shield shaft is rotated counterclockwise to rotate the shield downward, whereas in the case of shifting from the high beam to the low beam, the power supply to the solenoid is intercepted and the shield shaft is rotated clockwise by the return spring to rotate the shield upward to its original position.

Yet another feature of the present invention may be characterized by that weights for preventing movement of the shield shaft when the shield shaft is rotated are inserted into both ends of the shield shaft.

Still another feature of the present invention may be characterized by that support grooves into which the shield shaft is inserted to be supported are formed on both sides of the reflector, and the shield shaft is inserted and coupled to the support groove in a horizontal direction.

According to the projection head lamp assembly of the present invention as described above, the operation response property is improved through generation of an instantaneous torque in the shield and a compact structure is implemented in comparison to the head lamp assembly in the related art.

The projection head lamp assembly may include a shield monolithically formed with a shield shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
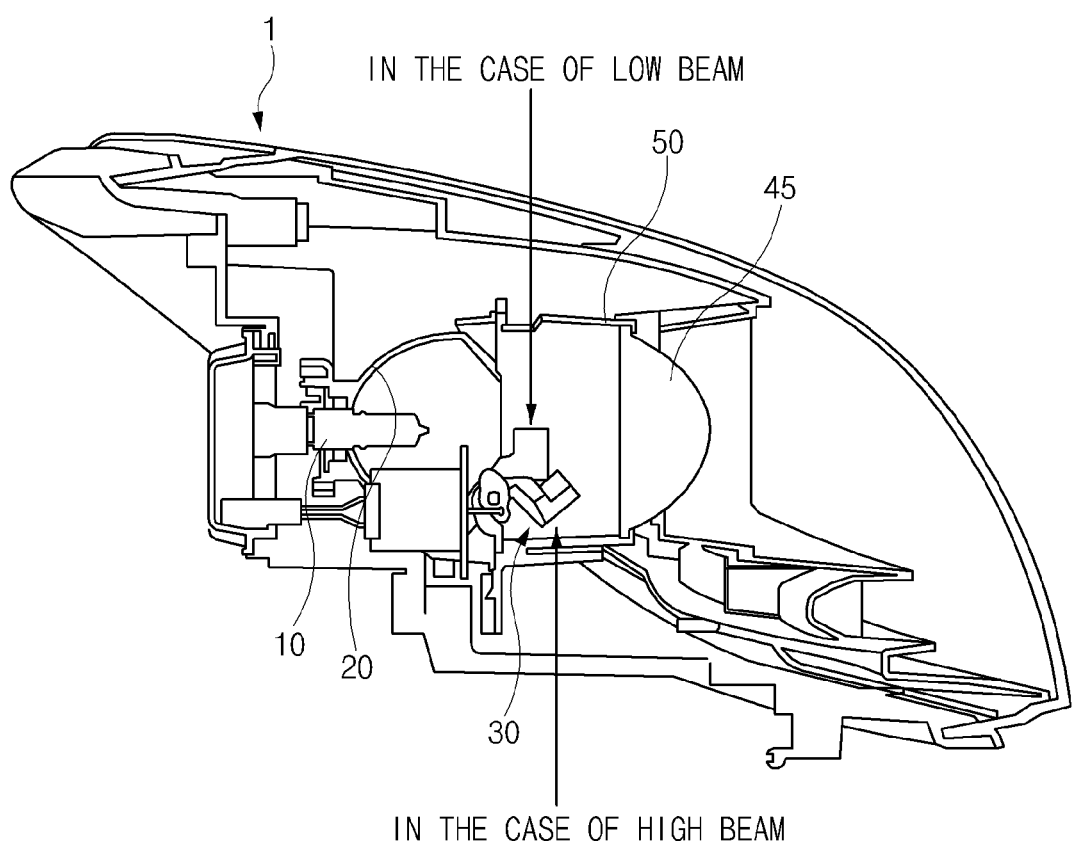
FIG. 1 is a side view of an exemplary projection head lamp assembly for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 2:
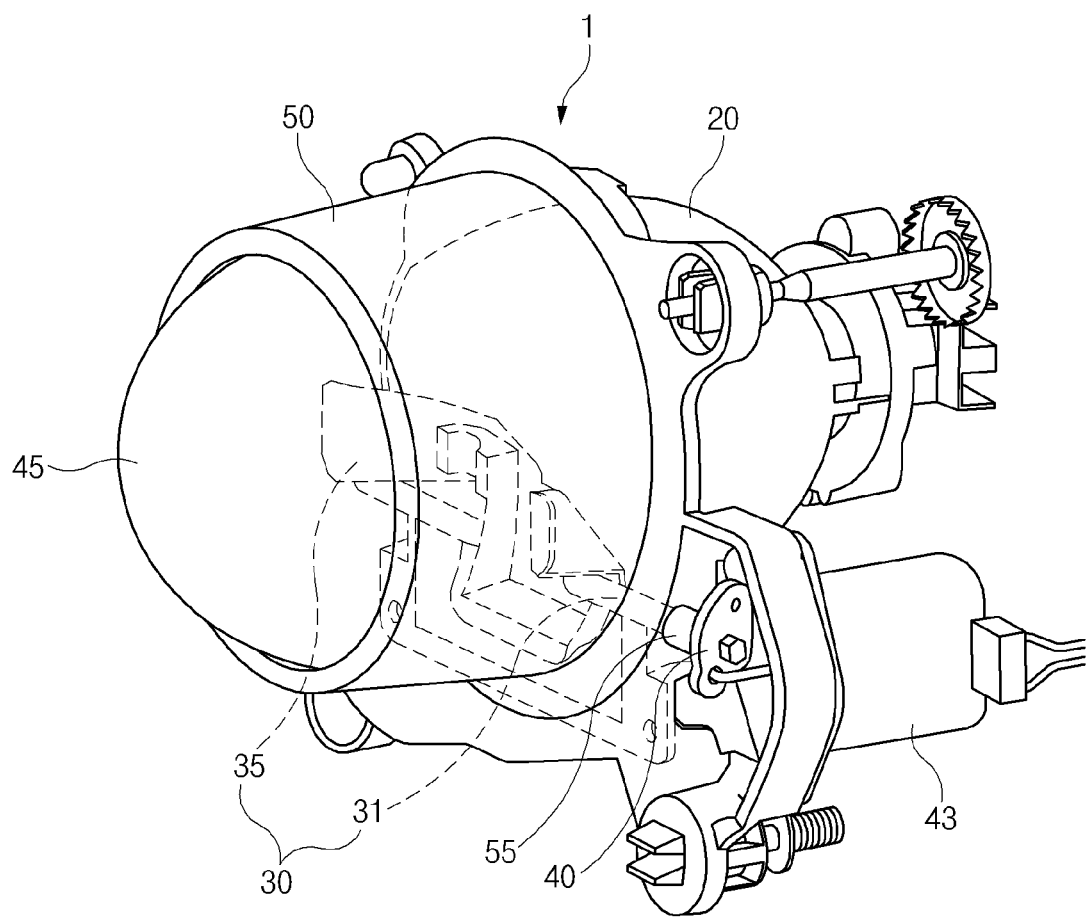
FIG. 2 is a front perspective view of an exemplary projection head lamp assembly for a vehicle according to the present invention.

A projection head lamp assembly 1 for a vehicle according to various embodiments of the present invention, as illustrated in FIGS. 1 and 2, may include a bulb 10, a reflector 20, a shield unit 30, a drive cam 40, and a lens 45.

The bulb 10 is a light source that is connected to a power supply to irradiate light. The bulb 10 is inserted substantially in the center portion of the reflector 20, and the light irradiated from the bulb 10 is reflected by the reflector 20 to be irradiated to the front.

The reflector 20 supports the bulb 10, and serves to reflect the light irradiated from the bulb 10.

The lens 45 is connected to the front of the reflector 20, and in this case, the lens 45 is connected to the reflector 20 in a state where the lens 45 is supported by a lens holder 50 that is coupled to the front of the reflector 20.

The shield unit 30 is provided between the reflector 20 and the lens 45, and serves to shift the light reflected by the reflector 20 to the low beam or the high beam by intercepting or passing part of the light reflected by the reflector 20.

Figure 3:
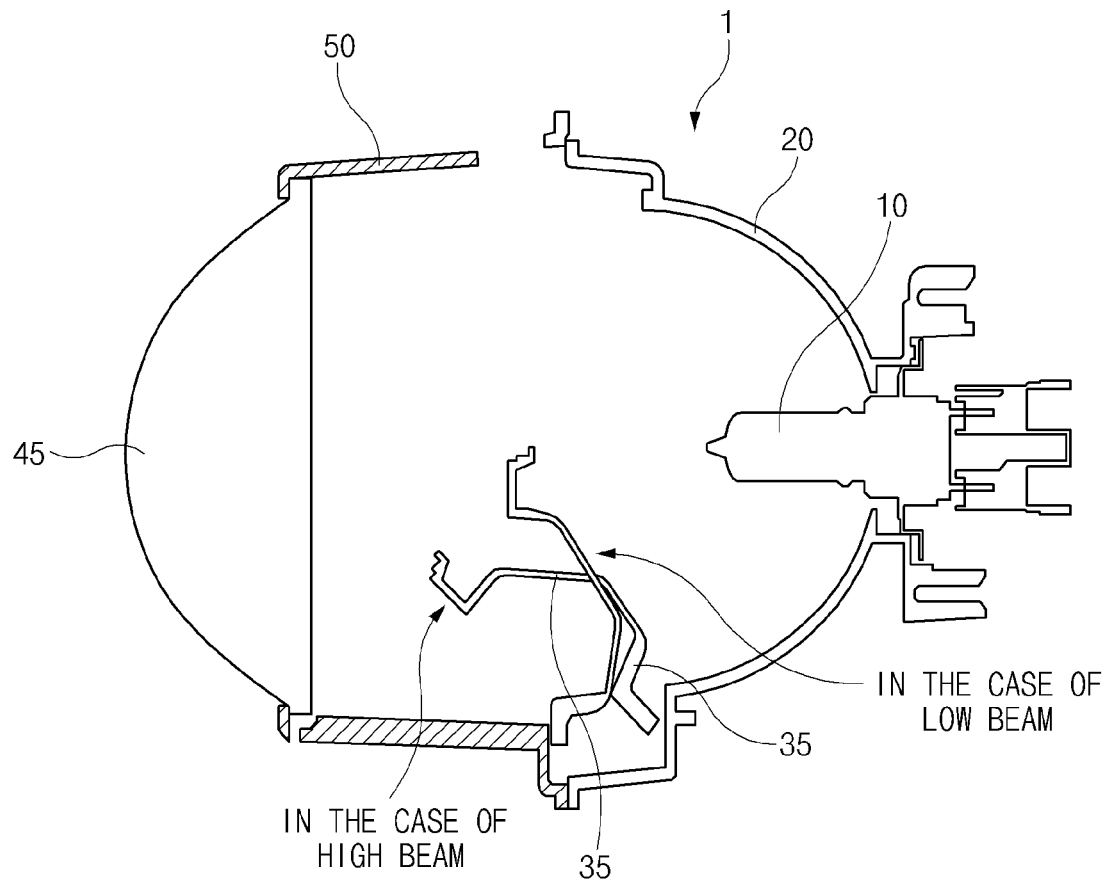
FIG. 3 is a cross-sectional view of FIG. 2.

Referring to FIGS. 2 and 3, the shield unit 30 includes a shield shaft 31 supported by the reflector 20, and a shield 35 integrally provided with the shield shaft 31. One will appreciate that the shield and shield shaft may be monolithically formed.

Figure 4:
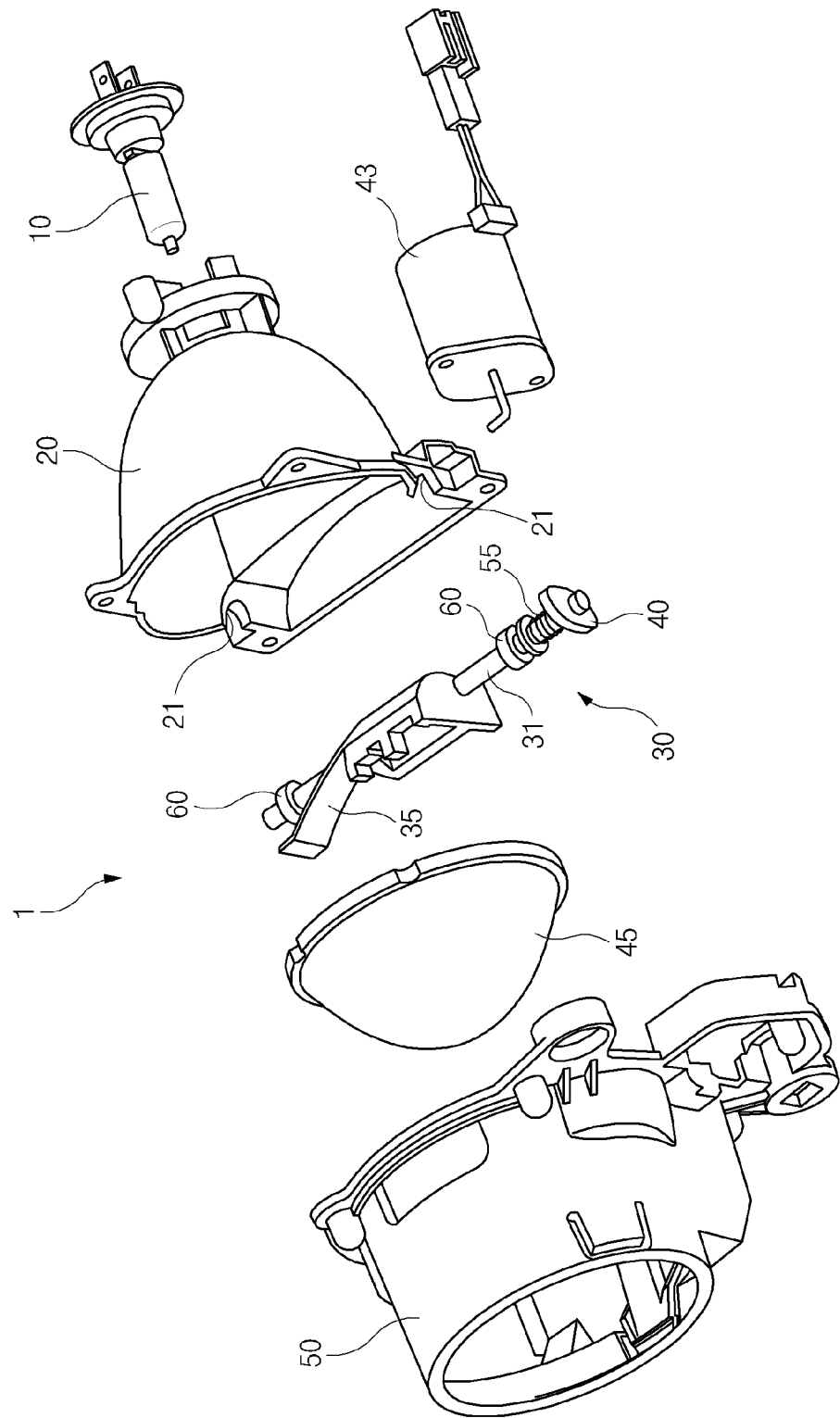
FIG. 4 is an exploded perspective view of FIG. 2.
Figure 5:
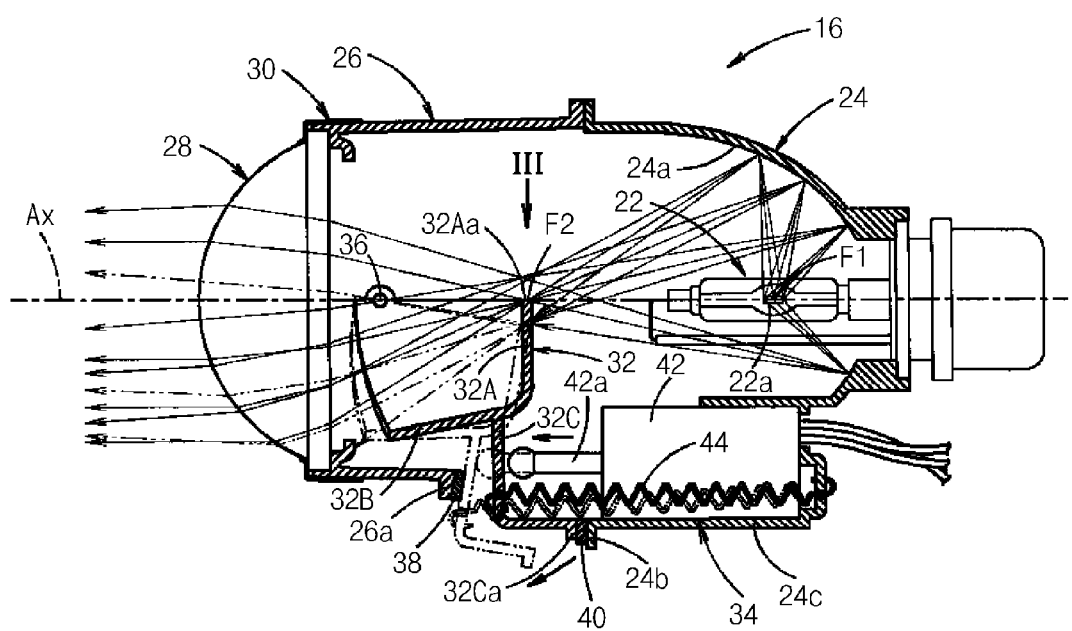
FIG. 5 is a cross-sectional view illustrating a head lamp for a vehicle in the related art.

Referring to FIG. 4, various embodiments provide features such that both ends of the shield shaft 31 are inserted and supported in support grooves 21 formed on both sides of the front end of the reflector 20 in a horizontal direction, and weights 60 for preventing free movement of the shield shaft 31 when the shield shaft 31 is rotated are inserted into both ends of the shield shaft 31.

In addition, various embodiments provide other features such that a return spring 55 having one end coupled to the drive cam 40 and the other end coupled to the shield shaft 31 is provided on an outer circumference of the shield shaft 31. If a power is applied to the solenoid 43 to rotate the shield shaft 31 counterclockwise, the return spring 55 is compressed, whereas if the power supply to the solenoid 43 is intercepted, the shield shaft 31 is rotated clockwise to its original position by the restoring force of the return spring 55.

Further, various embodiments provide still other features such that the drive cam 40, which is rotated according to the straight movement of the solenoid 43, is mounted at one end of the shield shaft 31 to rotate the shield unit 30.

The shield 35 has a shape that can intercept part of the light reflected by the reflector 20, and is rotated integrally with the shield shaft 31 that is rotated according to the straight movement of the solenoid 43 to form the low beam or the high beam.

That is, in the case of shifting from the low beam to the high beam, the power is applied to the solenoid 43 to pull the drive cam 40 to the rear, and the shield shaft 31 is rotated counterclockwise to rotate the shield 35 downward. At this time, almost all the light that is reflected by the reflector 20 is irradiated to the front (at this time, the return spring 55 is in a compressed state). In the case of shifting from the high beam to the low beam, the power supply to the solenoid 43 is intercepted, and the shield shaft 31 is rotated clockwise by the restoring force of the return spring 55 to rotate the shield 35 upward. At this time, part of the light that is reflected by the reflector 20 is intercepted by the shield 35.

As described above, according to the present invention, the drive cam 40 is installed at one end of the shield shaft 31. So even if the solenoid 43 is moved in a short distance of about 4 mm, it pulls or releases the drive cam 40, and hence rotates the shield 35, almost instantaneously. Accordingly, the operation response property is improved and the light distribution rule can be sufficiently satisfied.

Further, since components, such as the shield unit 30, the drive cam 40, the solenoid 43, and the like, can be mounted in a small space in comparison to the head lamp assembly in the related art, a compact structure of the projection head lamp assembly can be implemented.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A projection head lamp assembly a vehicle comprising:
a bulb irradiating light;
a reflector supporting the bulb and reflecting light irradiated from the bulb forward;
a shield unit including a shield shaft supported by the reflector and a shield integrally provided on the shield shaft;
a solenoid having a straight movement;
a drive cam inserted into one end of the shield shaft to be rotated according to the straight movement of the solenoid; and
a lens connected to the front of the reflector;

wherein a return spring having one end coupled to the drive cam and the other end coupled to the shield shaft is provided on an outer circumference of the shield shaft, wherein in the case of shifting from low beam to high beam, a power is applied to the solenoid to pull the drive cam to the rear and the shield shaft is rotated counter-clockwise to rotate the shield downward, and in the case of shifting from the high beam to the low beam, the power supply to the solenoid is intercepted and the shield shaft is rotated clockwise by the return spring to rotate the shield upward to its original position.

2. The projection head lamp assembly according to claim 1, wherein weights for preventing free movement of the shield shaft when the shield shaft is rotated are inserted into both ends of the shield shaft.

3. The projection head lamp assembly according to claim 1, wherein support grooves are formed on both sides of the reflector, and the shield shaft is inserted and coupled to the support grooves in a horizontal direction.

4. The projection head lamp assembly according to claim 1, wherein the shield is monolithically formed with the shield shaft.

\* \* \* \* \*